United States Patent
Feil et al.

(10) Patent No.: US 9,400,681 B1
(45) Date of Patent: Jul. 26, 2016

(54) MANAGING SCHEDULED TASKS WITHIN A VIRTUAL SPACE

(75) Inventors: George Feil, Oakland, CA (US);
Clifford J. Harrington, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 377 days.

(21) Appl. No.: 13/563,597

(22) Filed: Jul. 31, 2012

Related U.S. Application Data

(60) Provisional application No. 61/676,271, filed on Jul. 26, 2012.

(51) Int. Cl.
  *G06F 9/46* (2006.01)
  *G06F 9/48* (2006.01)
(52) U.S. Cl.
  CPC .................................. *G06F 9/4843* (2013.01)
(58) Field of Classification Search
  None
  See application file for complete search history.

(56) References Cited

U.S. PATENT DOCUMENTS

| | | | |
|---|---|---|---|
| 6,342,008 B1 * | 1/2002 | Toyohara | A63F 13/10 463/23 |
| 8,645,182 B2 * | 2/2014 | Johnson et al. | 705/7.21 |
| 2003/0190951 A1 * | 10/2003 | Matsumoto | 463/30 |

* cited by examiner

*Primary Examiner* — Mengyao Zhe
(74) *Attorney, Agent, or Firm* — Sheppard Mullin Richter & Hampton LLP

(57) ABSTRACT

Tasks scheduled to be performed at future times within a virtual space may be managed. Selections of one or more tasks performable within the virtual space may be received. The one or more tasks may include a first task associated with a first duration. The first task may be scheduled to be performed at a first time. The first time may be the first duration later than a time of receipt of the selection of the first task. Managing the scheduling of the first task may include one or more of (1) delaying performance of the first task so that the first task is scheduled to be performed at a time later than the first time, (2) advancing performance of the first task so that the first task is scheduled to be performed at a time before the first time, or (3) canceling performance of the first task.

13 Claims, 3 Drawing Sheets

MANAGING SCHEDULED TASKS WITHIN A VIRTUAL SPACE

CROSS-REFERENCE TO RELATED APPLICATIONS

This application claims the benefit of U.S. Provisional Patent Application Ser. No. 61/676,271, entitled "Managing Scheduled Tasks Within a Virtual Space", filed Jul. 26, 2012, which is hereby incorporated by reference into the present disclosure in its entirety.

FIELD OF THE DISCLOSURE

This disclosure relates to dynamically managing individual tasks scheduled to be performed at future times within a virtual space.

BACKGROUND

Task scheduling for virtual spaces exists. In conventional approaches, task scheduling is typically performed via an operating system command such as "cron" for UNIX, which may be loaded to direct performance of the scheduled tasks. Schedules associated with such commands are generally static in that the entire schedule must be reloaded if the scheduling of only one task is to be cancelled or rescheduled. Polling is also performed in some existing systems where a task schedule is periodically checked (e.g., every minute or second) to determine whether there is a task that should be performed at a current time. Using either operating system commands (e.g., cron) or polling to cancel or reschedule previously scheduled tasks may be computationally expensive.

SUMMARY

One aspect of the disclosure relates to a system configured to manage tasks scheduled to be performed at future times within a virtual space, in accordance with one or more implementations. Exemplary implementations may dynamically modify tasks on an individual basis such that any other scheduled tasks do not need to be reloaded. Further, pending tasks may be held in memory (e.g., RAM) so that polling is unnecessary. The system may facilitate scheduling granularity of one or less seconds such that a given task is performed at exactly its scheduled time. In some implementations, performance of a given task may be accelerated provided that a user has performed a specific action such as purchasing a certain virtual item and/or other actions, as described further herein. In some implementations, the system may include one or more servers. The server(s) may be configured to communicate with one or more client computing platforms according to a client/server architecture. The users may access the system and/or the virtual space via client computing platform(s).

The server(s) may be configured to execute one or more computer program modules. The computer program modules may include one or more of a user module, a space module, a task selection module, a task scheduling module, a task managing module, a managing enablement module, a schedule monitoring module, a scheduling interface module, and/or other modules. The user module may be configured to access and/or manage one or more user profiles and/or user information associated with users of the system. The space module may be configured to implement the instance of the virtual space executed by the computer modules to determine views of the virtual space.

The task selection module may be configured to receive selections of one or more tasks performable within the virtual space. Individual tasks may be associated with corresponding durations. For example, a given task may be associated with a duration in which the given task takes to complete or a duration which must pass before the given task is performed. Tasks may be selected via client computing platform(s). Tasks may be selected from a list of available tasks. Tasks may be selected in a gameplay context associated with the virtual space. That is, during gameplay, a user may be presented with an option to select a task. By way of non-limiting example, a task may include one or more of training troops, marching troops, building a city or component thereof, planting crops, researching upgrades of various capabilities (e.g., troop combat capabilities or resource production capacity), and/or other tasks that are performable within the virtual space.

The task scheduling module may be configured to schedule performance of the one or more selected tasks within the virtual space. Scheduling performance of a given task may be based on the duration associated with the given task. For example, a first task may be associated with a first duration. The first task may be scheduled to be performed at a first time. The first time may be the first duration later than a time of receipt of the selection of the first task. For tasks that take time to complete, scheduling performance may include scheduling a completion time.

The task scheduling module may provide a dynamic schedule. The dynamic schedule may convey times at which individual ones of the selected tasks are to be performed. The dynamic schedule may be held in memory (e.g., RAM) so that it is readily accessible. In some implementations, the dynamic schedule may be stored in a relational database as a backup. Thus, in the event of a system failure or restart, the dynamic schedule may be reloaded into memory from the relational database. The dynamic schedule may facilitate rescheduling and/or canceling of tasks on an individual basis. The dynamic schedule may have a granularity equal to or less than one second.

The task managing module may be configured to manage the scheduling of the performance of the one or more selected tasks. According to some implementations, managing the scheduling of a given task may include rescheduling and/or canceling performance of the given task. Rescheduling a first task that has been scheduled to be performed at a first time may include (1) delaying performance of the first task so that the first task is scheduled to be performed at a time later than first time or (2) advancing performance of the first task so that the first task is scheduled to be performed at a time before the first time. In some implementations, the scheduling of other selected tasks may be unaffected by rescheduling and/or canceling a given task.

The managing enablement module may be configured to receive one or more indications of user actions. Receipt of the given indication may enable management of the scheduling of the given task by task managing module. A given indication may be associated with a given user action. By way of non-limiting example, a user action may include one or more of purchasing a virtual item, obtaining a virtual item, utilizing a virtual item, paying an amount of virtual currency, paying an amount of real currency, and/or other user actions. To illustrate enabling management of the scheduling of a given task, a user may be required to purchase and/or otherwise obtain a specific virtual item in order to accelerate completion of the given task. In some implementations, a user may be required to obtain a "speed-up boost" in order to accelerate completion of a given task. In some implementations, an amount of time in which performance of a given task is advanced or delayed may be based on a corresponding user action. To illustrate, performance of a given task may be advanced a given unit of time (e.g., 5 minutes) in exchange for a given unit of virtual currency. As another non-limiting illustration, performance of a given task may be advanced by a percentage (e.g., 20% or 75%) of the time remaining by utilizing a virtual item (e.g., a "speed-up boost").

The schedule monitoring module may be configured to monitor scheduling and/or performance of the one or more selected tasks. Monitoring scheduling and/or performance may include a variety of operations. In some implementations, monitoring scheduling and/or performance may include reporting execution failures responsive to a given task failing to be performed at a corresponding scheduled time. In some implementations, monitoring scheduling and/or performance may include determining a latency between a scheduled time and an actual performance time for a given task. The latency may be a duration of time between the scheduled time and the actual performance time for the given task. In some implementations, monitoring scheduling and/or performance may include providing an alert notification responsive to the latency breeching a threshold latency. A threshold latency may include a maximum duration between the scheduled time and the actual performance time for the given task. In some implementations, monitoring scheduling and/or performance may include providing a report of currently scheduled tasks. Currently scheduled tasks may include tasks associated with a single user and/or a plurality of users. In some implementations, monitoring scheduling and/or performance may include providing an indication of a number of scheduled tasks. The number of scheduled tasks may be associated with tasks of a single user and/or tasks of a plurality of users. In some implementations, the scheduling monitoring module may be configured to provide administrative monitoring tools configured to measure and/or analyze task schedules and/or performance metrics.

The scheduling interface module may be configured to provide a task scheduling interface for presentation to a user. The task scheduling interface may be presented via client computing platform(s). The task scheduling interface may include one or more of a task selection field, a task scheduling field, a user action indication field, a reports field, and/or other fields and/or information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
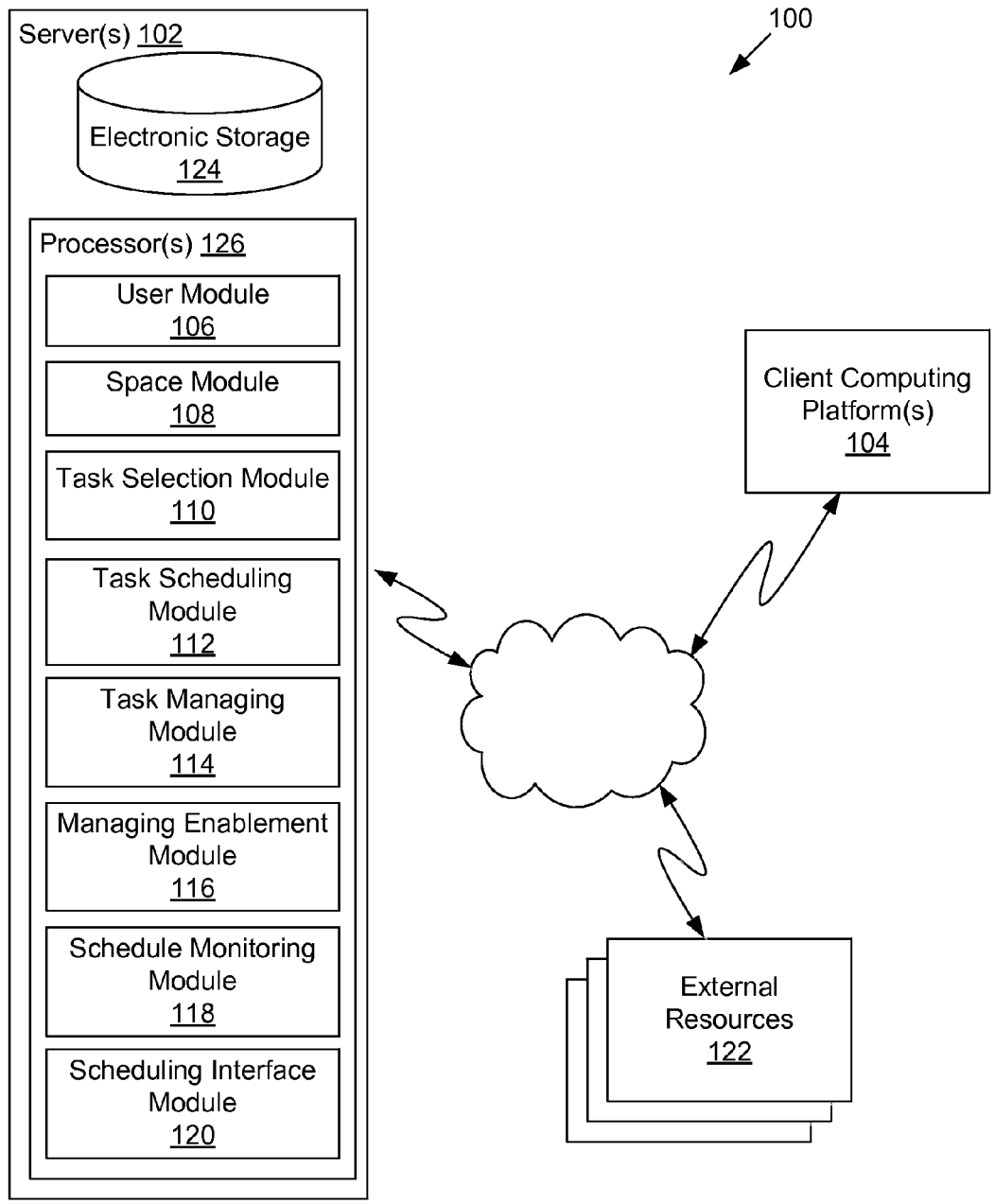
FIG. 1 illustrates a system configured to manage tasks scheduled to be performed at future times within a virtual space, in accordance with one or more implementations.

FIG. 1 illustrates a system 100 configured to manage tasks scheduled to be performed at future times within a virtual space, in accordance with one or more implementations. Exemplary implementations may dynamically modify tasks on an individual basis such that any other scheduled tasks do not need to be reloaded. Further, pending tasks may be held in memory (e.g., RAM) so that polling is unnecessary. The system 100 may facilitate scheduling granularity of one or less seconds such that a given task is performed at exactly its scheduled time. In some implementations, performance of a given task may be accelerated provided that a user has performed a specific action such as purchasing a certain virtual item and/or other actions, as described further herein. In some implementations, system 100 may include one or more servers 102. The server(s) 102 may be configured to communicate with one or more client computing platforms 104 according to a client/server architecture. The users may access system 100 and/or the virtual space via client computing platform(s) 104.

The server(s) 102 may be configured to execute one or more computer program modules. The computer program modules may include one or more of a user module 106, a space module 108, a task selection module 110, a task scheduling module 112, a task managing module 114, a managing enablement module 116, a schedule monitoring module 118, a scheduling interface module 120, and/or other modules.

The user module 106 may be configured to access and/or manage one or more user profiles and/or user information associated with users of system 100. The one or more user profiles and/or user information may include information stored by server(s) 102, one or more of client computing platform(s) 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 108 may be configured to implement the instance of the virtual space executed by the computer modules to determine views of the virtual space. The views may then be communicated (e.g., via streaming, via object/position data, and/or other information) from server(s) 102 to client computing platform(s) 104 for presentation to users. The view determined and transmitted to a given client computing platform 104 may correspond to a user character being controlled by a user via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 108 is not intended to be limiting. The space module 108 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 104. The users may interact with each other through communications exchanged within the virtual space. Such communications may include one or more of textual chat, instant messages, private messages, voice communications, and/or other communications. Communications may be received and entered by the users via their respective client computing platform(s) 104. Communications may be routed to and from the appropriate users through server(s) 102 (e.g., through space module 108).

The task selection module 110 may be configured to receive selections of one or more tasks performable within the virtual space. Individual tasks may be associated with corresponding durations. For example, a given task may be associated with a duration in which the given task takes to complete or a duration which must pass before the given task is performed. Tasks may be selected via client computing platform(s) 104. Tasks may be selected from a list of available tasks. Tasks may be selected in a gameplay context associated with the virtual space. That is, during gameplay, a user may be presented with an option to select a task. By way of non-limiting example, a task may include one or more of training troops, marching troops, building a city or component thereof, planting crops, researching upgrades of various capabilities (e.g., troop combat capabilities or resource production capacity), and/or other tasks that are performable within the virtual space.

The task scheduling module 112 may be configured to schedule performance of the one or more selected tasks within the virtual space. Scheduling performance of a given task may be based on the duration associated with the given task. For example, a first task may be associated with a first duration. The first task may be scheduled to be performed at a first time. The first time may be the first duration later than a time of receipt of the selection of the first task. For tasks that take time to complete, scheduling performance may include scheduling a completion time.

The task scheduling module 112 may provide a dynamic schedule. The dynamic schedule may convey times at which individual ones of the selected tasks are to be performed. The dynamic schedule may be held in memory (e.g., RAM) so that it is readily accessible. In some implementations, the dynamic schedule may be stored in a relational database as a backup. Thus, in the event of a system failure or restart, the dynamic schedule may be reloaded into memory from the relational database. The dynamic schedule may facilitate rescheduling and/or canceling of tasks on an individual basis. The dynamic schedule may have a granularity equal to or less than one second.

The task managing module 114 may be configured to manage the scheduling of the performance of the one or more selected tasks. According to some implementations, managing the scheduling of a given task may include rescheduling and/or canceling performance of the given task. Rescheduling a first task that has been scheduled to be performed at a first time may include (1) delaying performance of the first task so that the first task is scheduled to be performed at a time later than the first time or (2) advancing performance of the first task so that the first task is scheduled to be performed at a time before the first time. In some implementations, the scheduling of other selected tasks may be unaffected by rescheduling and/or canceling a given task.

The managing enablement module 116 may be configured to receive one or more indications of user actions. Receipt of the given indication may enable management of the scheduling of the given task by task managing module 114. A given indication may be associated with a given user action. By way of non-limiting example, a user action may include one or more of purchasing a virtual item, obtaining a virtual item, utilizing a virtual item, paying an amount of virtual currency, paying an amount of real currency, and/or other user actions. To illustrate enabling management of the scheduling of a given task, a user may be required to purchase and/or otherwise obtain a specific virtual item in order to accelerate completion of the given task. In some implementations, a user may be required to obtain a "speed-up boost" in order to accelerate completion of a given task. In some implementations, an amount of time in which performance of a given task is advanced or delayed may be based on a corresponding user action. To illustrate, performance of a given task may be advanced a given unit of time (e.g., 5 minutes) in exchange for a given unit of virtual currency. As another non-limiting illustration, performance of a given task may be advanced by a percentage (e.g., 20% or 75%) of the time remaining by utilizing a virtual item (e.g., a "speed-up boost").

The schedule monitoring module 118 may be configured to monitor scheduling and/or performance of the one or more selected tasks. Monitoring scheduling and/or performance may include a variety of operations. In some implementations, monitoring scheduling and/or performance may include reporting execution failures responsive to a given task failing to be performed at a corresponding scheduled time. In some implementations, monitoring scheduling and/or performance may include determining a latency between a scheduled time and an actual performance time for a given task. The latency may be a duration of time between the scheduled time and the actual performance time for the given task. In some implementations, monitoring scheduling and/or performance may include providing an alert notification responsive to the latency breeching a threshold latency. A threshold latency may include a maximum duration between the scheduled time and the actual performance time for the given task. In some implementations, monitoring scheduling and/or performance may include providing a report of currently scheduled tasks. Currently scheduled tasks may include tasks associated with a single user and/or a plurality of users. In some implementations, monitoring scheduling and/or performance may include providing an indication of a number of scheduled tasks. The number of scheduled tasks may be associated with tasks of a single user and/or tasks of a plurality of users. In some implementations, scheduling monitoring module 118 may be configured to provide administrative monitoring tools configured to measure and/or analyze task schedules and/or performance metrics.

Figure 2:
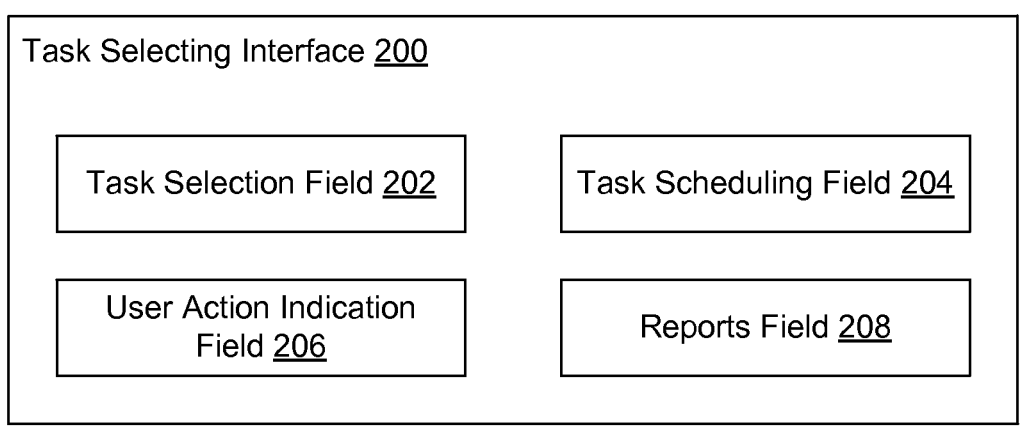
FIG. 2 illustrates an exemplary task scheduling interface, in accordance with one or more implementations.

The scheduling interface module 120 may be configured to provide a task scheduling interface for presentation to a user. FIG. 2 illustrates an exemplary task scheduling interface 200, in accordance with one or more implementations. The task scheduling interface 200 may be presented via client computing platform(s) 104. As depicted in FIG. 2, task scheduling interface 200 may include one or more of a task selection field 202, a task scheduling field 204, a user action indication field 206, a reports field 208, and/or other fields and/or information. The depiction of task scheduling interface 200 in FIG. 2 is not intended to be limiting as one or more of fields 202, 204, 206, and/or 208 may be omitted or combined with another field.

The task selection field 202 may convey information associated with one or more available tasks. Such tasks may be selected by a user via task selection field 202. In some implementations, task selection field 202 may be provided by or in conjunction with task selection module 110.

The task scheduling field 204 may include a task schedule and/or other representation conveying information associated with the scheduled performance of one or more selected tasks. The task schedule may convey information identifying individual scheduled tasks, a time remaining until individual tasks are to be performed and/or completed, one or more user actions for which corresponding indications must be received in order to reschedule and/or cancel a given task, and/or other information associated with the scheduled performance of one or more tasks. Scheduled tasks may be managed via task scheduling field 204. For example, a user may select a given scheduled task from task scheduling field 204 to reschedule and/or cancel. The task scheduling field 204 may be updated responsive to one or more scheduled tasks being rescheduled and/or canceled. In some implementations, task scheduling field 204 may be provided by or in conjunction with task scheduling module 112 and/or task managing module 114.

The user action indication field 206 may convey information associated with user actions that can be performed to enable managing of individual scheduled tasks. The user action indication field 206 may provide a list of user actions. The user action indication field 206 may convey a correspondence between a given user action and a given task. In some implementations, user action indication field 206 may be provided by or in conjunction with managing enablement module 116.

The reports field 208 may convey information associated with scheduling and/or performance of one or more tasks. Such information may include one or more of (1) an indication of execution failures associated with a given task failing to be performed at a corresponding scheduled time, (2) a latency between a scheduled time and an actual performance time for a given task, (3) an alert notification responsive to the latency breeching a threshold latency, (4) an indication of currently scheduled tasks, (5) an indication of a number of scheduled tasks, and/or other information associated with scheduling and/or performance of one or more tasks. In some implementations, reports field 208 may be provided by or in conjunction with schedule monitoring module 118.

Turning back to FIG. 1, server(s) 102, client computing platform(s) 104, and/or external resources 122 may be operatively linked via one or more electronic communication links, according to some implementations. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

The external resources 122 may include sources of information, hosts and/or providers of virtual spaces outside of system 100, external entities participating with system 100, and/or other resources. In some implementations, some or all of the functionality attributed herein to external resources 122 may be provided by resources included in system 100.

The server(s) 102 may include electronic storage 124, one or more processors 126, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise electronic storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126 may include one or more virtual storage resources (e.g., cloud storage, a virtual private network, and/or other virtual storage resources). Electronic storage 126 may store software algorithms, information determined by processor(s) 124, information received from server(s) 102, information received from client computing platform(s) 104, and/or other information that enables server(s) 102 to function as described herein.

Processor(s) 126 is configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. The processor(s) 126 may be configured to execute modules 106, 108, 110, 112, 114, 116, 118, 120, and/or other modules. The processor(s) 126 may be configured to execute modules 106, 108, 110, 112, 114, 116, 118, 120, and/or other modules by software; hardware; firmware; some combination of software, hardware, and/or firmware; and/or other mechanisms for configuring processing capabilities on processor(s) 126.

It should be appreciated that although modules 106, 108, 110, 112, 114, 116, 118, and 120 are illustrated in FIG. 1 as being co-located within a single processing unit, in implementations in which processor(s) 126 includes multiple processing units, one or more of modules 106, 108, 110, 112, 114, 116, 118, and/or 120 may be located remotely from the other modules. The description of the functionality provided by the different modules 106, 108, 110, 112, 114, 116, 118, and/or 120 described below is for illustrative purposes, and is not intended to be limiting, as any of modules 106, 108, 110, 112, 114, 116, 118, and/or 120 may provide more or less functionality than is described. For example, one or more of modules 106, 108, 110, 112, 114, 116, 118, and/or 120 may be eliminated, and some or all of its functionality may be provided by other ones of modules 106, 108, 110, 112, 114, 116, 118, and/or 120. As another example, processor(s) 126 may be configured to execute one or more additional modules that may perform some or all of the functionality attributed herein to one of modules 106, 108, 110, 112, 114, 116, 118, and/or 120.

Figure 3:
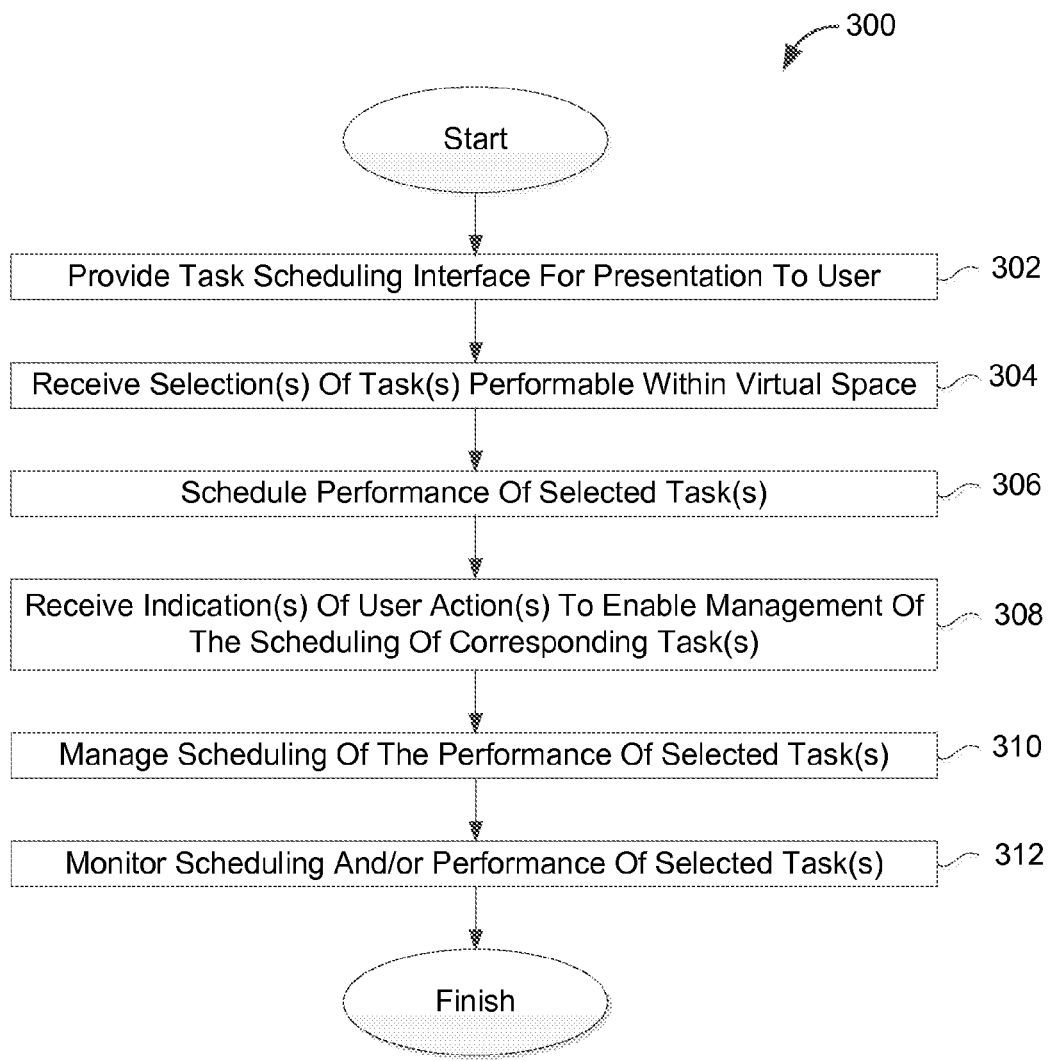
FIG. 3 illustrates a method for managing tasks scheduled to be performed at future times within a virtual space, in accordance with one or more implementations.

FIG. 3 illustrates a method 300 for managing tasks scheduled to be performed at future times within a virtual space, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a task scheduling interface may be provided for presentation to a user. Operation 302 may be performed by a scheduling interface module that is the same as or similar to scheduling interface module 120, in accordance with one or more implementations.

At an operation 304, selections of one or more tasks performable within the virtual space may be received. Operation 304 may be performed by a task selection module that is the same as or similar to task selection module 110, in accordance with one or more implementations.

At an operation 306, performance within the virtual space of the one or more selected tasks may be scheduled. Operation 306 may be performed by a task scheduling module that is the same as or similar to task scheduling module 112, in accordance with one or more implementations.

At an operation 308, one or more indications of user actions may be received, wherein receipt of a given indication may enable management of the scheduling of a corresponding task. Operation 308 may be performed by a managing enablement module that is the same as or similar to managing enablement module 116, in accordance with one or more implementations.

At an operation 310, the scheduling of the performance of the one or more selected tasks may be managed, which may be responsive to receipt of the one or more indications of user actions. Operation 310 may be performed by a task managing module that is the same as or similar to task managing module 114, in accordance with one or more implementations.

At an operation 312, scheduling and/or performance of the one or more selected tasks may be monitored. Operation 312 may be performed by a schedule monitoring module that is the same as or similar to schedule monitoring module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to manage tasks scheduled to be performed at future times within a virtual space, the system comprising:

electronic storage media that stores:

a task schedule, the task schedule indicating user selected tasks to be performed in an instance of a game implemented in an instance of the virtual space and scheduled times at which the user selected tasks are to be executed, tasks that are selectable by users for automatic execution within the game, the tasks including a first task, and task durations associated with the individual tasks, the task durations including a first task; and one or more processors configured by machine-readable instructions to:

execute an instance of the virtual space, to implement the instance of the game in the instance of the virtual space and to execute user selected tasks in the virtual space in accordance with the task schedule, wherein execution of the individual user selected tasks impact outcome of the game in the virtual space;

receive user selections of the tasks;

schedule performance of the user selected tasks within the instance of the game in the virtual space in accordance with the task durations associated with the individual tasks such that in response to receipt of user selection of the first task at a request time, the first task is scheduled to be performed at a first time, the first time being later than the request time of the user selection of the first task by an amount of time corresponding to the first task duration, wherein scheduling performance of the user selected tasks comprises including the user selected tasks in the task schedule and the scheduled times at which the user selected tasks are to be executed; and manage the scheduling of the execution of individual ones of the user selected tasks included in the task schedule, wherein managing the scheduling of the first task includes:

receive one or more indications of user actions that are separate from the user selection of the first task at a request time, the one or more indications including a first indication associated with a first user action wherein the first user action must be performed in order to modify the scheduled execution of the first task such that receipt of the first indication associated with the first user action enables management of the scheduled execution of the first task, and wherein the first user action includes one or more of purchasing a virtual item, obtaining a virtual item, utilizing a virtual item, paying an amount of virtual currency, or paying an amount of real currency;

obtaining user input to modify the scheduled execution of the first task, such that the user input provides an indication to do one or more of (1) delay execution of the first task so that the first task is scheduled to be executed at a time later than the first time, (2) advance execution of the first task so that the first task is scheduled to be executed at a time before the first time, or (3) cancel execution of the first task, and modifying, in the task schedule, responsive to receiving the one or more indications of user actions including the first indication that the first user action was performed and responsive to obtaining user input to modify the scheduled execution of the first task, the scheduled time at which the first task is to be executed in accordance with the user input.

2. The system of claim 1, wherein the one or more processors are configured by machine-readable instructions such that managing the scheduling of the first task further includes rescheduling at least one other user selected task in the task schedule based on the modification of the scheduled time at which the first task is to be executed.

3. The system of claim 1, wherein the task schedule has a granularity equal to or less than one second.

4. The system of claim 1, wherein execution of a given task includes completion of the given task.

5. The system of claim 1, wherein the one or more processors are configured by machine-readable instructions such that managing the scheduling of the first task leaves a scheduled time at which at least one other user selected task is to be performed unaffected by the modification of the scheduled time at which the first task is to be performed.

6. The system of claim 1, wherein an amount of time in which performance of the first task is advanced or delayed is based on the first user action.

7. The system of claim 1, wherein the one or more processors are configured by machine-readable instructions to monitor scheduling and execution of the user selected tasks, wherein the monitoring includes one or more of (1) reporting execution failures responsive to a given task failing to be executed at a corresponding scheduled time, (2) determining a latency between a scheduled time and an actual execution time for a given task, (3) providing an alert notification responsive to the latency breeching a threshold latency, (4) providing a report of currently scheduled tasks, or (5) providing an indication of a number of scheduled tasks.

8. A method for managing tasks scheduled to be performed at future times within a virtual space, the method to being implemented in a computer system including electronic storage media storing machine-readable instructions, and one or more computer processors, the method comprising:

storing with electronic storage media:

a task schedule, the task schedule indicating user selected tasks to be performed in an instance of a game implemented in an instance of the virtual space and scheduled times at which the user selected tasks are to be executed;

tasks that are selectable by users for automatic execution within the game, the tasks including a first task; and task durations associated with the individual tasks, the task durations including a first task; and executing with one or more computer processors configured to execute machine-readable instructions, an instance of a virtual space;

implementing the instance of the game in the instance of the virtual space;

executing user selected tasks in the virtual space in accordance with the task schedule, wherein execution of the individual user selected tasks impact outcome of the game in virtual space;

receiving user selections of the tasks;

scheduling performance of the user selected tasks within the instance of the game in the virtual space in accordance with the task durations associated with the individual tasks such that in response to receipt of user selection of the first task at a request time, the first task is scheduled to be performed at a first time, the first time being later than the request time of the user selection of the first task by an amount of time corresponding to the first task duration, wherein scheduling performance of the user selected tasks comprises including the user selected tasks in the task schedule list and the scheduled times at which the user selected tasks are to be executed; and managing the scheduling of the execution of individual ones of the user selected tasks included in the task schedule, wherein managing the scheduling of the first task includes:

receiving one or more indications of user actions that are separate from the user selection of the first task at a request time, the one or more indications including a first indication associated with a first user action wherein the first user action must be performed in order to modify the scheduled execution of the first task such that receipt of the first indication associated with the first user action enables management of the scheduled execution of the first task, wherein the first user action includes one or more of purchasing a virtual item, obtaining a virtual item, utilizing a virtual item, paying an amount of virtual currency, or paying an amount of real currency;

obtaining user input to modify the scheduled execution of the first task, such that the user input an indication to do one or more of (1) delay execution of the first task so that the first task is scheduled to be executed at a time later than the first time, (2) advance execution of the first task so that the first task is scheduled to be executed at a time before the first time, or (3) cancel execution of the first task, and modifying, in the task schedule, responsive to receiving the one or more indications of user actions including the first indication that the first user action was performed and responsive to obtaining user input to modify the scheduled execution of the first task, the scheduled time at which the first task is to be executed in accordance with the user input.

9. The method of claim 8, wherein managing the scheduling of the first task further includes rescheduling at least one other user selected task in the task schedule based on modification of the scheduled time at which the first task is to be executed.

10. The method of claim 9, wherein the task schedule has a granularity equal to or less than one second.

11. The method of claim 8, wherein managing the scheduling of the first task leaves a scheduled time at which the first task is to be performed.

12. The method of claim 8, wherein an amount of time in which performance of the first task is advanced or delayed is based on the first user action.

13. The method of claim 8, further comprising monitoring scheduling and execution of the user selected tasks, wherein the monitoring includes one or more of (1) reporting execution failures responsive to a given task failing to be executed at a corresponding scheduled time, (2) determining a latency between a scheduled time and an actual execution time for a given task, (3) providing an alert notification responsive to the latency breeching a threshold latency, (4) providing a report of currently scheduled tasks, or (5) providing an indication of a number of scheduled tasks.

* * * * *